(12) United States Patent
Ito et al.

(10) Patent No.: US 6,734,928 B2
(45) Date of Patent: May 11, 2004

(54) LIQUID CRYSTAL DISPLAY DEVICE

(75) Inventors: Masaru Ito, Mobara (JP); Shinya Hashimoto, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/321,596

(22) Filed: Dec. 18, 2002

(65) Prior Publication Data

US 2003/0128307 A1 Jul. 10, 2003

(30) Foreign Application Priority Data

Jan. 8, 2002 (JP) .................................... 2002-001204

(51) Int. Cl.[7] ................................................ G02F 1/13
(52) U.S. Cl. ......................................................... 349/58
(58) Field of Search ............................................. 349/58

(56) References Cited

U.S. PATENT DOCUMENTS 5,406,399 A * 4/1995 Koike ........................... 349/58
6,177,971 B1 * 1/2001 Jung et al. ..................... 349/60
6,216,329 B1   4/2001 Kaga et al.

FOREIGN PATENT DOCUMENTS

| JP | 7-283560 | 10/1995 |
| JP | 8-286623 | 11/1996 |
| JP | 9-5722 | 1/1997 |

\* cited by examiner

*Primary Examiner*—James A. Dudek
(74) *Attorney, Agent, or Firm*—Reed Smith LLP; Stanley P. Fisher, Esq.; Juan Carlos A. Marquez, Esq.

(57) ABSTRACT

The present invention provides a liquid crystal display device which can enlarge an effective display region without lowering a light quantity and can reduce a thickness and a weight thereof. A thin-film spacers having resiliency is arranged in the inside of a metal frame for holding a liquid crystal display panel. The spacer includes protrusions and a liquid crystal display panel is fixed by utilizing the resiliency of the protrusions. Further, by using resin material having high reflectance as a material of the spacer, it is possible to suppress the leaking of light from a light guide plate so that the lowering of luminance of the liquid crystal display device can be obviated.

8 Claims, 10 Drawing Sheets

LIQUID CRYSTAL DISPLAY DEVICE

BACKGROUND OF THE INVENTION

1. Field of the Invention

The present invention relates to a liquid crystal display device which integrally houses a liquid crystal display panel and a backlight which constitutes an illumination light source and is formed on a back side of the panel in a metal frame, and more particularly to a liquid crystal display device which can expand an effective display region, can reduce the thickness and the weight thereof, and can enhance the luminance by effectively utilizing an illumination light of the backlight.

2. Description of the Related Art

A liquid crystal display device forms an electronic latent image on a liquid crystal display panel and visualizes the electronic latent image by irradiating an illumination light. There have been known a liquid crystal display device which utilizes an external light as the illumination light and a liquid crystal display device which incorporates an illumination light source which irradiates light to a back surface or a front surface of the liquid crystal display panel. With respect to a liquid crystal display device which is utilized as display means of a portable electronic terminal such as a portable phone set, a liquid crystal display device which is usually known as a reflective type and uses an external light has been popularly used to achieve the reduction of weight and power consumption. However, because of a demand for a color display and the enhancement of image quality in recent years, a liquid crystal display device which incorporates an illumination light source in a liquid crystal display panel has been popularly used.

With respect to this type of illumination light source, a front light type light source which installs a light source at a front-surface side of a liquid crystal display panel and a backlight type light source which installs a light source on a back side of the liquid crystal display panel have been adopted as a main stream. Particularly, in a liquid crystal display device which uses a color liquid crystal display panel of an active matrix type, a backlight which can easily provide a uniform illumination over a whole surface of a display region thereof and can obtain an illumination light of high luminance has been popularly adopted.

Among various types of backlights, there have been a direct type which installs a light source right below a back surface of a liquid crystal display panel and a side edge type which laminates a light guide plate on a back side of a liquid crystal display panel and installs a light source such as linear lamps or light emitting diodes at end peripheries of the light guide plate. Particularly, with respect to an electronic terminal having a small screen, a liquid crystal display device which adopts the side edge type backlight has been popularly adopted for reducing the thickness and the weight thereof. In the backlight type liquid crystal display device using such a light guide plate, the liquid crystal display panel and the light guide plate have been integrally housed in a laminated manner in a metal frame.

In performing the housing operation, to fix the liquid crystal display, to protect the liquid crystal display from an external impact, and to prevent the lowering of the luminance ratio of the backlight, the liquid crystal display panel and the light guide plate are once housed in a resin-made frame-like mold (resin mold) and then the resin mold is fitted into the metal frame. Accordingly, an effective display region of the liquid crystal display panel is limited by an inner periphery of the resin mold. Further, to prevent a phenomenon that light which propagates in the inside of the light guide plate leaks from end peripheries of the light guide plate thus reducing a quantity of light irradiated to a liquid crystal display panel side, reflection tapes are adhered to the end peripheries of the light guide plate or reflection materials are applied to the end peripheries of the light guide plate. As the prior art which protects the liquid crystal display panel from an external impact, there have been known techniques disclosed in Japanese Laid-open Patent 283560/1995, Japanese Laid-open Patent 286623/1996 and Japanese Laid-open Patent 5722/1997.

In general, the resin mold is an injection molded product and hence, at least a minimum wall thickness of approximately 0.5 mm is necessary at a side wall portion and at a bottom wall portion of the resin mold in view of the restriction imposed by molding conditions. Further, a fixing mechanism for fixing the metal frame and the resin mold is also necessary. This pushes up a manufacturing cost of a mold for forming a resin mold or brings about the lowering of yield factor when the fixing mechanism ruptures at the time of assembling. Further, in the liquid crystal display device which adheres the reflection tapes to the end peripheries of the light guide plate or applies the reflection materials to the end peripheries of the light guide plate, the manufacturing steps become cumbersome. These constitute obstacles which hamper the enlargement of the effective display region and the reduction of thickness and weight of the liquid crystal display device.

In view of the above, it may be possible to propose an idea to directly house the liquid crystal display panel and the light guide plate in the inside of the metal frame without using the resin mold. However, since a substrate of the liquid crystal display panel is usually constituted of a glass material, a buffer structure is necessary between the substrate and the metal frame. Further, when the adhesion of the reflection tapes or the applying of the reflection materials to the end peripheries of the light guide plate is omitted, a quantity of light which is irradiated is reduced.

Accordingly, it is an object of the present invention to provide a liquid crystal display device which can enlarge an effective display region and can reduce a thickness and a weight thereof without using a resin mold and without applying reflection tapes or reflection materials to end peripheries of a light guide plate by adhesion or coating thus preventing the lowering of a quantity of irradiating light.

SUMMARY OF THE INVENTION

According to the present invention, a thin-wall spacer having resiliency is integrally formed on an inside of a metal frame and a liquid crystal display panel is fixed to the metal frame by utilizing the resiliency of the spacer. Further, the spacer is formed of a resin material having high reflectance so that light from a light guide plate is effectively utilized whereby the lowering of luminance is obviated.

Due to such a constitution, it is possible to reduce the thickness and the weight of a whole liquid crystal display device and, at the same time, to attenuate an external impact transmitted from the metal frame to the liquid crystal display panel and the light guide plate. Further, the removal of the liquid crystal display panel can be prevented by forming the spacer into a given shape or setting physical characteristics of the spacer to given values. Still further, by molding the spacer using a resin material having high reflectance, it is possible to effectively utilize light from the light guide plate thus obviating the lowering of luminance.

BRIEF DESCRIPTION OF THE DRAWING

FIG. 1A, FIG. 1B and FIG. 1C are explanatory views showing the first embodiment of a liquid crystal display device according to the present invention, wherein FIG. 1A is a plan view, FIG. 1B is a cross-sectional view taken along a line A—A in FIG. 1A, and FIG. 1C is a cross-sectional view taken along a line B—B in FIG. 1A.

FIG. 4A and FIG. 4B are explanatory views showing the fourth embodiment of a liquid crystal display device according to the present invention, wherein FIG. 4A is a plan view and FIG. 4B is a cross-sectional view taken along a line C—C in FIG. 4A.

DESCRIPTION OF THE PREFERRED EMBODIMENTS

Figure 1A:
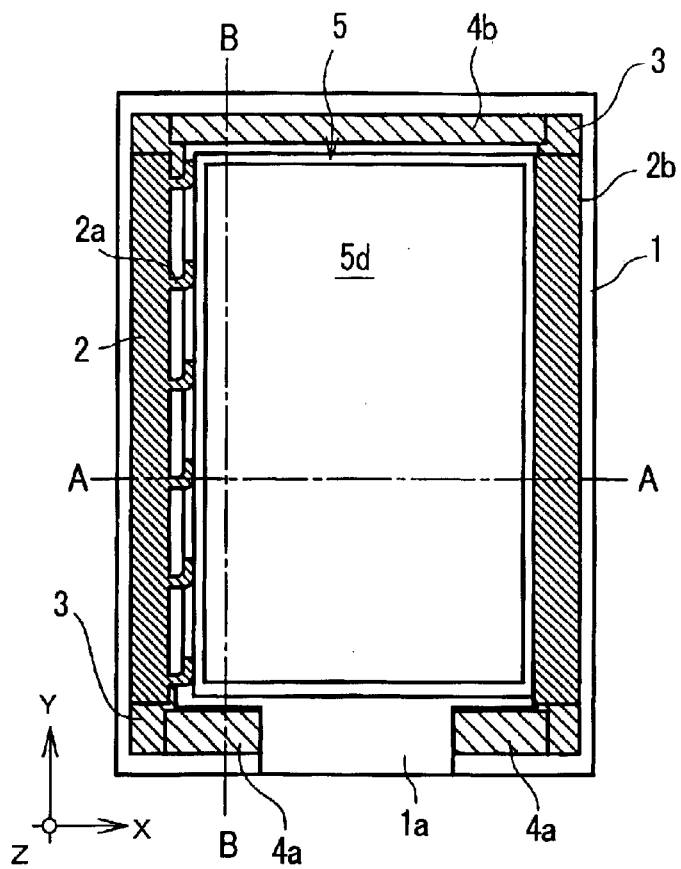

To describe a typical constitutions of a liquid crystal display device according to the present invention, they are as follows.

(1). A liquid crystal display device comprises a liquid crystal display panel, a light guide plate which is arranged on a back side of the liquid crystal display panel, a metal frame which has a frame-like side wall and houses the liquid crystal display panel and the light guide plate therein, and a spacer which is interposed between two respective parallel sides of the liquid crystal display panel and the side wall of the metal frame and is integrally formed with the metal frame, wherein the spacer is made of resin having high reflectance, the liquid crystal display panel is housed in the inside of the metal frame due to resilience of the spacer, and the liquid crystal display panel is held by the metal frame due to a repulsive force of the resilience.

(2). In the above-mentioned constitution (1), the spacer includes a first portion which holds the liquid crystal display panel due to the repulsive force of the resilience and a second portion which holds the light guide plate in place, and a resilience quantity of the first portion is larger than that of the second portion.

(3). In the above-mentioned constitution (2), the first portion is comprised of protrusions which are formed discontinuously along the sides of the liquid crystal display panel and the resilience is generated by the deflection of the protrusions when the protrusions are pushed to a periphery of the liquid crystal display panel.

(4). In the above-mentioned constitution (2), the first portion and the second portion are respectively made of resins which differ in the resilience quantity from each other.

(5). A liquid crystal display device comprises a liquid crystal display panel, a light guide plate which is arranged on a back side of the liquid crystal display panel, a metal frame which has a frame-like side wall and houses the liquid crystal display panel and the light guide plate therein, and a spacer which is interposed between two respective parallel sides of the liquid crystal display panel and the side wall of the metal frame and is integrally formed with the metal frame, wherein the spacer is made of resin having high reflectance, pawls are formed on end peripheries of the light guide plate which face the spacer in an opposed manner, pawl catchers are formed on the spacers, the light guide plate is fixed in place in the metal frame by engaging the pawls with the pawl catchers, the liquid crystal display panel is housed in the metal frame due to resilience of the spacer, and the liquid crystal display panel is held by the metal frame due to a repulsive force of the resilience.

(6). In the above-mentioned constitution (5), the spacer includes a first portion which holds the liquid crystal display panel due to the repulsive force of the resilience and a second portion which holds the light guide plate in place, and a resilience quantity of the first portion is larger than that of the second portion.

(7). In the above-mentioned constitution (5), the first portion is comprised of protrusions which are formed discontinuously along the sides of the liquid crystal display panel and the resilience is generated by the deflection of the protrusions.

(8). In the above-mentioned constitution (5), the first portion and the second portion are respectively made of resins which differ in the resilience quantity from each other.

It is needless to say that the present invention is not limited to the above-mentioned constitutions and the constitutions of embodiments explained later and includes various modifications thereof without departing from the technical concept of the present invention.

The preferred embodiments of the present invention are explained in detail in conjunction with drawings showing embodiments. Parts which are equal in respective drawings are given the same numerals.

A liquid crystal display device according to the present invention is a side edge type liquid crystal display device in which a light guide plate is laminated to a back surface of a liquid crystal display panel and light sources such as linear lamps, light emitting diodes or the like are arranged at end peripheries of the light guide plate.

Figure 1C:
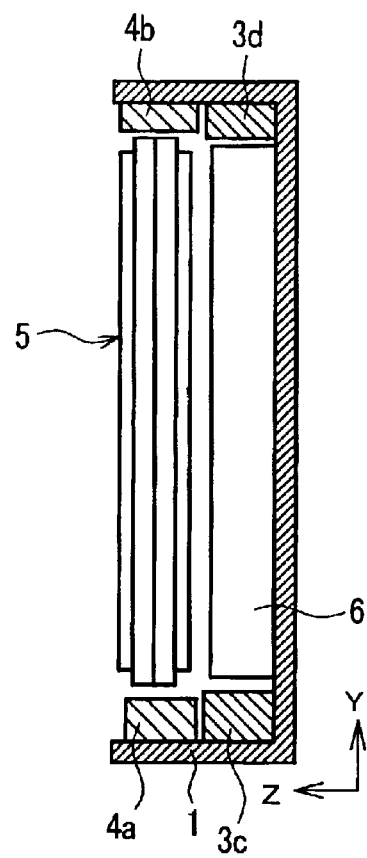
Figure 1B:
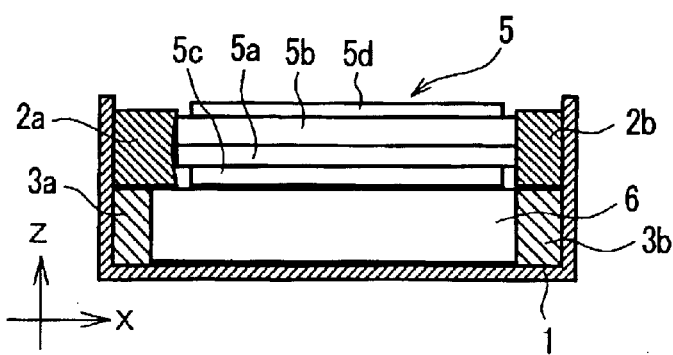

FIG. 1A, FIG. 1B and FIG. 1C are explanatory views showing the first embodiment of a liquid crystal display device according to the present invention, wherein FIG. 1A is a plan view as viewed from side of image indication panel of a liquid crystal display, FIG. 1B is a cross-sectional view taken along a line A—A in FIG. 1A, and FIG. 1C is a cross-sectional view taken along a line B—B in FIG. 1A. In FIG. 1A, FIG. 1B and FIG. 1C, numeral 1 indicates a metal frame, numeral 2 indicates a first portion of a spacer, numeral 3 indicates a second portion of the spacer, numeral 4 indicates a third portion of the spacer, numeral 5 indicates a liquid crystal display panel, and numeral 6 indicates a light guide plate which constitutes a backlight. Although the backlight is constituted of the light guide plate, light sources which are arranged at side walls of the light guide plate 6, an optical compensation sheet which is arranged between the liquid crystal display panel 5 and the light guide plate 6, a light reflection sheet which is arranged below the light guide plate 6 and the like, only the light guide plate 6 is shown in the drawing.

The metal frame 1 is a housing which defines a final contour of the liquid crystal display device. The spacer is fixed to a pair of long sides, one short side and portions of another short side of the metal frame 1. An opening which is served for arranging a flexible printed circuit board is formed at a center region of another short side. The spacer is comprised of the first portion 2 which fixes the liquid crystal display panel 5 and the second portion 3 which fixes the light guide plate 6. The second portion 3 has functions of positioning and fixing the light guide plate 6 and is comprised of pressure contact portions 3a, 3b, 3c, 3d. The pressure contact portions 3a, 3b are brought into pressure contact with the light guide plate 6 in the X direction and the pressure contact portions 3c, 3d are brought into pressure contact with the light guide plate 6 in the Y direction. The first portion 2 of the spacer includes protrusions 2a, 2b, wherein the protrusion 2a has one end thereof fixed to an inner wall of the metal frame 1 at one of a pair of parallel long sides (left side in FIG. 1A) and protrudes in the direction toward the liquid crystal display panel 5 (X direction).

The protrusion 2b has one end thereof fixed to the inner wall of the metal frame 1 at another of a pair of parallel long sides (right side in FIG. 1A) and protrudes in the direction toward the liquid crystal display panel 5 (X direction). Further, the third portion 4 of the spacer is constituted of cushion portions 4a, 4b which face the liquid crystal display panel 5 in an opposed manner in the Y direction at inner sides of the parallel short sides of the metal frame 1. In this embodiment, the first portion 2 and the second portion 3 of the spacer are fixed to the inner wall of the metal frame 1 in a state that they are separated from each other in the Z direction. The spacer having the first portion 2, the second portion 3 and the third portion 4 is integrally mounted on the inner wall of the metal frame 1 by hot melting, injection molding or using pressure sensitive adhesive double coated tapes.

The protrusion 2a and the protrusion 2b are made of resins which differ in hardness respectively. The protrusion 2a is made of resin having low hardness and the protrusion 2b is made of resin having high hardness. By fixing the metal frame 1 and the spacer by hot melting, it is possible to firmly fix the metal frame 1 and the spacer to each other so that it is possible to prevent the removal of the spacer and to easily assemble a module. As a method for performing the hot melting of the metal frame 1 and the spacer, the injection molding can be used. In this embodiment, an aluminum alloy is used as a material of the metal frame 1 and thermoplastic elastomer is used as a material of the spacer. Further, the metal frame 1 may be made of a magnesium alloy.

The liquid crystal display device using the metal frame 1 on which such a spacer is integrally formed is assembled in accordance with following steps. First of all, the backlight is assembled into the prepared metal frame 1. The light guide plate 6 has a rectangular contour and respective sides of the light guide plate 6 are positioned and held by the pressure contact portions 3a, 3b and 3c, 3d which constitute the second portion 3 of the spacer 3 provided to a bottom portion side of the metal frame 1. Thereafter, the liquid crystal display panel 5 is mounted on the backlight. In mounting the liquid crystal display panel 5 in the metal frame 1, one long side (left side in FIG. 1A) of the liquid crystal display panel 5 is brought into pressure contact with the protrusion 2a of the first portion 2 of the spacer and the projection 2a is deflected due to the resilience.

In this state, another long side (right side in FIG. 1A) of the liquid crystal display panel 5 is fitted into the metal frame 1 such that another long side faces the protrusion 2b of the first portion 2 of the spacer arranged at the right side of the metal frame 1 in the drawing and, then, the above-mentioned pressing force is released. Accordingly, another long side of the liquid crystal display panel 5 is brought into contact with the protrusion 2b due to a repulsive force of the resilient deformation of the protrusion 2a so that the another long side is fixedly held. Here, the respective short sides of the liquid crystal display panel 5 face the cushion portions 4a, 4b respectively and hence, when an impact is applied to the short sides of the liquid crystal display panel 5 from outside, the applied impact is attenuated by an attenuation force of the cushion portions 4a, 4b.

By using a resin material having high light reflectance as the resin material of the spacer, it is possible to effectively utilize light leaked from the light guide plate 6 as an illumination light of the liquid crystal display panel 5 whereby the lowering of the luminance can be obviated. It is preferable that the resin material has the light reflectance of equal to or more than 70% and is constituted of a so-called white resin in which titanium oxide is mixed. It is needless to say that the positions of the protrusions 2a, 3b, 2c, 2d of the first portion 2 and the third portion 4 of the spacer can be changed with respect to respective opposing sides.

In the liquid crystal display panel 5, a liquid crystal layer is inserted in a gap defined between two adhered sheets of glass substrates 5a, 5b and polarizers 5c, 5d are laminated to both of front and back surfaces of the liquid crystal display panel 5 respectively. Further, although optical compensation sheets such as a diffusion sheet, a prism sheet and the like are inserted between the light guide plate 6 and the liquid crystal display panel 5, they are omitted from the drawings. In this embodiment, the optical compensation sheets may be also held between the first portion 2 and the second portion 3 of the spacer. Further, as the light guide plate 6, it is possible to use a light guide plate 6 to which the optical compensation sheets are adhered to the liquid crystal display panel side.

According to this embodiment, since a resin mold which has been used conventionally for positioning and holding the liquid crystal display panel and the light guide plate is no longer used, it is possible to realize the reduction of thickness and weight of the whole liquid crystal display device. Further, the external impact transmitted to the liquid crystal display panel 5 and the light guide plate 6 through the metal frame 1 is absorbed or attenuated by the spacer and hence, a damage on the liquid crystal display panel 5 caused the external impact can be largely reduced. Further, by molding the spacer using the resin material having high reflectance, it is possible to effectively utilize light from the light guide plate 6 whereby the lowering of luminance can be obviated.

Figure 2:
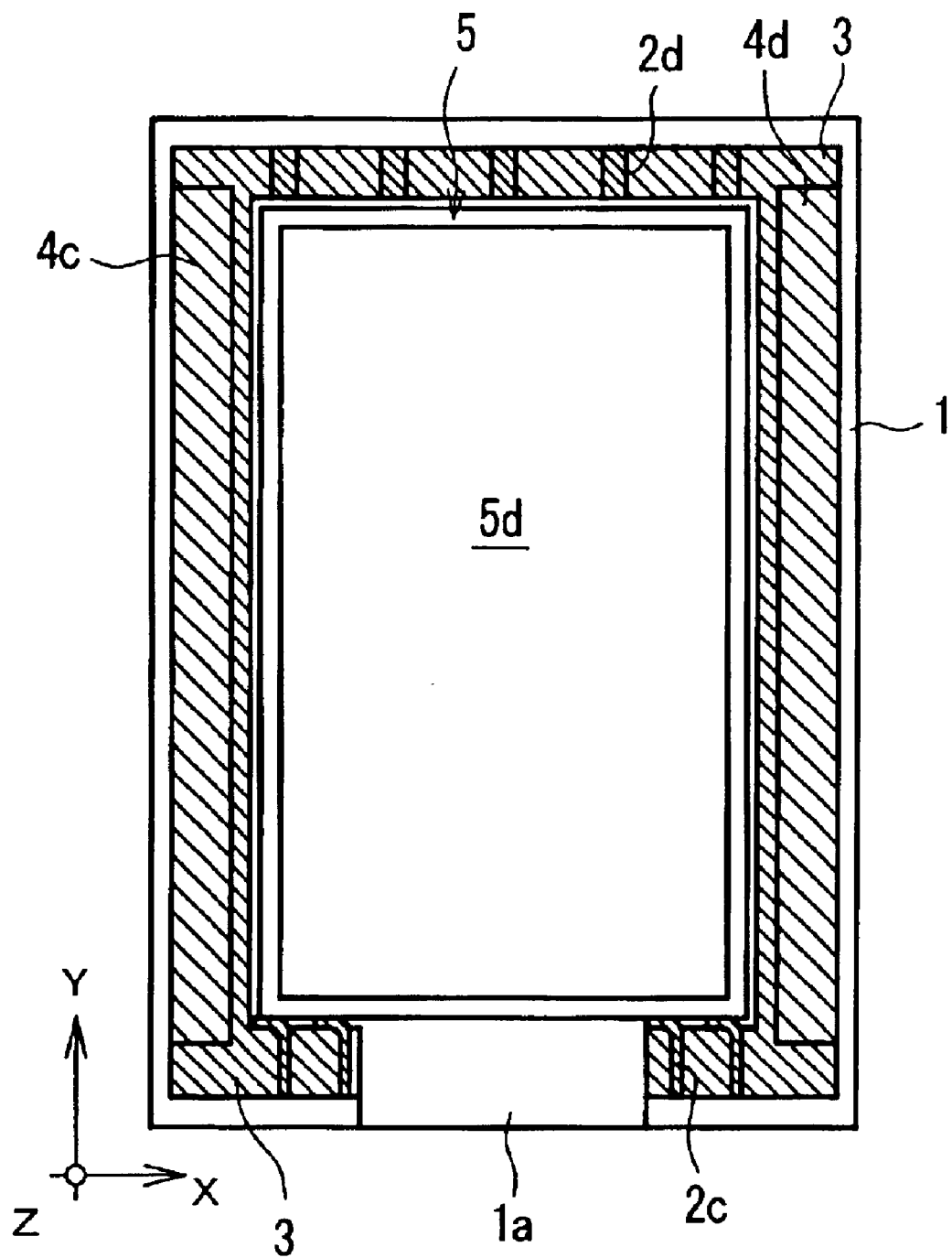
FIG. 2 is a plan view as viewed from a liquid crystal display panel side for explaining the second embodiment of the liquid crystal display device according to the present invention.

FIG. 2 is a plan view as viewed from the liquid crystal display panel side for explaining the second embodiment of the liquid crystal display device according to the present invention. Numerals in FIG. 2 which are equal to those used in FIG. 1 indicate identical parts. In the above-mentioned embodiment explained in conjunction with FIG. 1, the protrusions which constitute the first portion of the spacer are provided to the long sides of the metal frame 1. To the contrary, in this embodiment, the protrusion 2c and the protrusion 2d are provided to the short sides of the metal frame 1 and the cushion portions 4a, 4b are provided to the long sides.

The protrusions 2c provided to both sides of the opening 1a at a lower short side in FIG. 2 have a slightly longer length in the direction of the liquid crystal display panel 5 than protrusions 2d provided to the upper short side. However, these lengths are not particularly limited and these lengths are sufficient provided that the protrusions 2c, 2d can fix the liquid crystal display panel 5 using the resilient deformation and the repulsive force thereof. In integrally forming the liquid crystal display panel 5 into the metal frame 1 thus fabricating the liquid crystal display device, first of all, the lower side of the liquid crystal display panel 5 is pushed to sides of the protrusions 2c of the first portion 2 of the spacer (the side ends of the protrusions 2c fixed to the liquid crystal display panel) so as to deflect the protrusions 2c utilizing the resilient deformation thereof.

In this state, another short side (the upper short side in FIG. 2) of the liquid crystal display panel 5 is fitted into the metal frame 1 such that another short side faces in an opposed manner the protrusions 2d of the first portion 2 of the spacer provided to the upper side (in the drawing) of the metal frame land, thereafter, the above-mentioned pushing force is released. Accordingly, another short side of the liquid crystal display panel 5 is brought into contact with the protrusions 2d due to a repulsive force of the resilient deformation of the protrusions 2d and is fixed and held in place. The respective long sides of the liquid crystal display panel 5 face the cushion portions 4C, 4d in an opposed manner and, when an impact is applied to the long sides from the outside of the liquid crystal display panel 5, the applied impact to the long sides is alleviated due to a buffer force of the cushion portions 4c, 4d. Also in this embodiment, it is needless to say that the positions of the protrusions 2a, 3b, 2c, 2d of the first portion 2 and the third portion 4 of the spacer can be changed with respect to respective opposing sides.

In the same manner as the above-mentioned embodiment, by using a resin material having high light reflectance as the resin material of the spacer, it is possible to effectively utilize light leaked from the light guide plate 6 as an illumination light of the liquid crystal display panel 5 whereby the lowering of the luminance can be obviated. It is preferable that the resin material has the light reflectance of equal to or more than 70% and is constituted of a so-called white resin in which titanium oxide is mixed. The constitution of the second portion of the spacer and other constitutions are similar to those shown in FIG. 1.

According to this embodiment, since a resin mold which has been used conventionally for positioning and holding the liquid crystal display panel and the light guide plate is no more used, it is possible to realize the reduction of thickness and weight of the whole liquid crystal display device. Further, the external impact transmitted to the liquid crystal display panel 5 and the light guide plate 6 through the metal frame 1 is absorbed or attenuated by the spacer and hence, a damage on the liquid crystal display panel 5 caused by the external impact can be largely reduced. Further, by molding the spacer using the resin material having high reflectance, it is possible to effectively utilize light from the light guide plate 6 whereby the lowering of luminance can be obviated.

Figure 3:
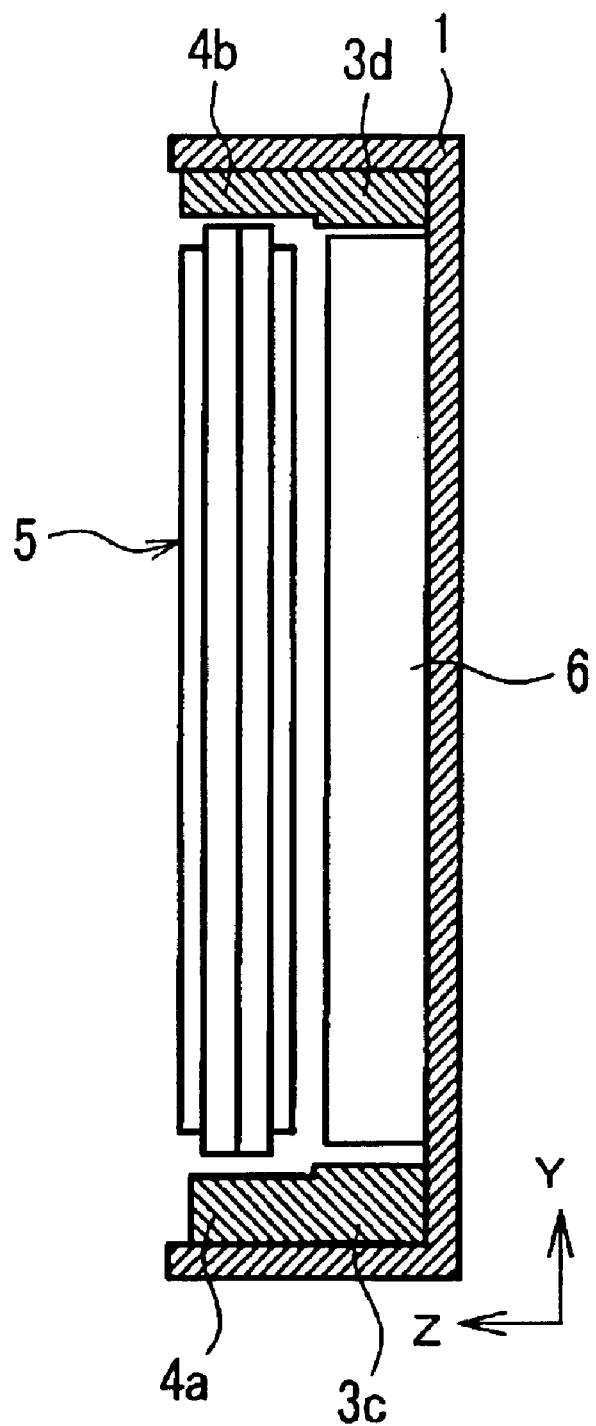
FIG. 3 is a cross-sectional view for explaining the third embodiment of the liquid crystal display device according to the present invention.

FIG. 3 is a cross-sectional view for explaining the third embodiment of the liquid crystal display device according to the present invention. Numerals in FIG. 3 which are equal to those used in FIG. 1A, FIG. 1B, FIG. 1C and FIG. 2 indicate identical parts. This embodiment is characterized in that the Y-direction cushion portions 4a, 4b of the third portion 4 of the spacer and the Y-direction pressure contact portions 3c, 3d of the light guide plate 6 are integrally formed. This embodiment is also applicable to the spacer of the second embodiment in the same manner.

The cushion portions 4a, 4b and the pressure contact portions 3c, 3d which constitute buffer members for protecting the liquid crystal display panel 5 and the light guide plate 6 from an external impact are not required to have the resiliency which the protrusions 2a to 2d of the first portion 2 for holding and fixing the liquid crystal display panel 5 possess. Accordingly, even when the cushion portions 4a, 4b and the pressure contact portions 3c, 3d are integrally formed as in the case of this embodiment, the original functions are not hardly damaged.

Also according to this embodiment, it is possible to realize the reduction of thickness and weight of the whole liquid crystal display device. Further, the external impact transmitted to the liquid crystal display panel 5 and the light guide plate 6 through the metal frame 1 is absorbed or attenuated by the spacer and hence, a damage on the liquid crystal display panel 5 caused by the external impact can be largely reduced. Further, by molding the spacer using the resin material having high reflectance, it is possible to effectively utilize light from the light guide plate 6 whereby the lowering of luminance can be obviated.

Figures 4A, 4B:
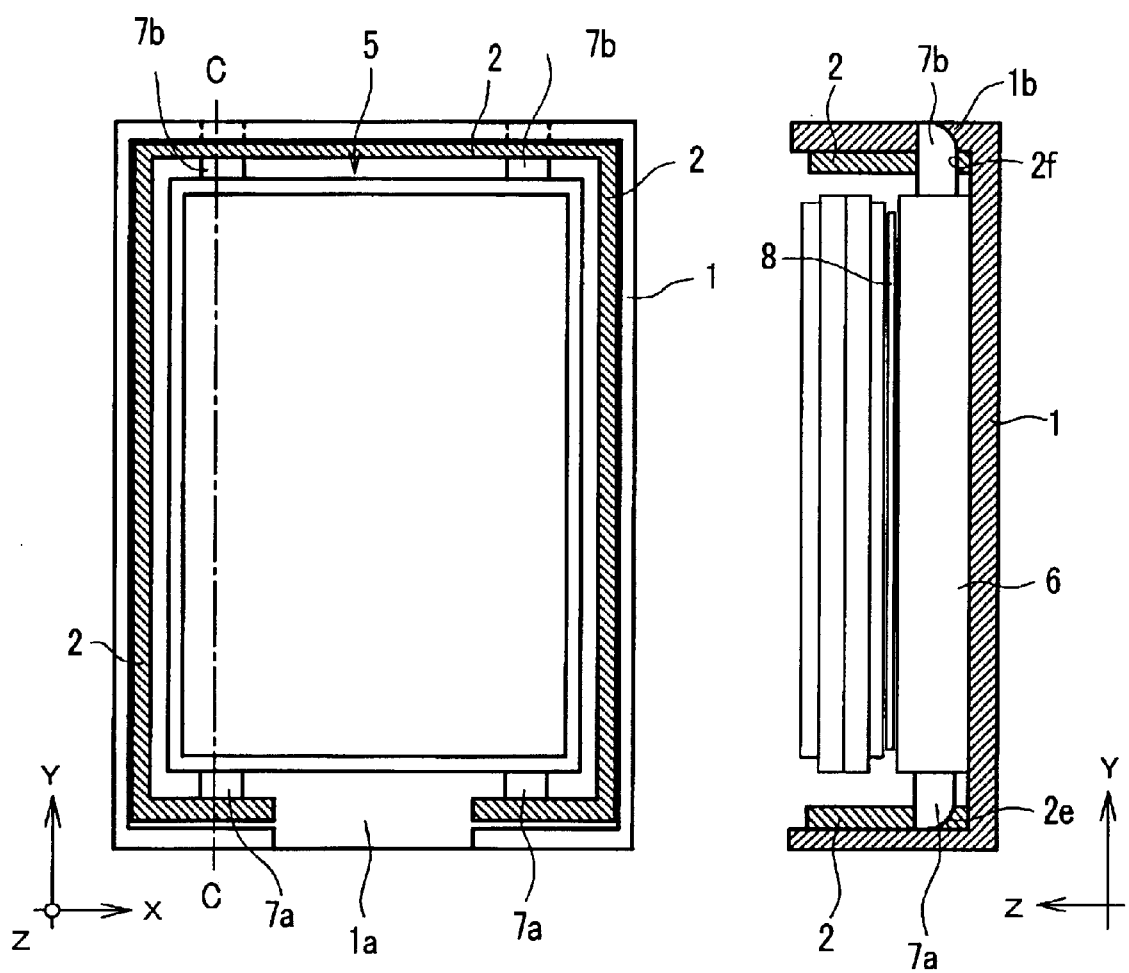

FIG. 4A and FIG. 4B are explanatory views showing the fourth embodiment of a liquid crystal display device according to the present invention, wherein FIG. 4A is a plan view as viewed from the liquid crystal display panel side and FIG. 4B is a cross-sectional view taken along a line C—C in FIG. 4A. Also in this embodiment, a spacer 2 is fixed to and along an inner wall surface of a metal frame 1 by fusing or injection molding. The spacer 2 is formed by molding using a resin material having high reflectance. Although the spacer 2 is mainly provided for suppressing the lowering of luminance attributed to the leaking of light from a light guide plate 6, the spacer 2 also has a function of protecting a liquid crystal display panel 5 and the light guide plate 6 from an external impact.

Two parallel sides (short sides in this embodiment) of the light guide plate 6 which constitutes a backlight are respectively provided with pawls 7a, 7b. Two pawls 7a, 7b are formed on each short side in this embodiment. Although these pawls 7a, 7b are integrally formed with the light guide plate 6, they may be adhered to the light guide plate 6 as separate parts. On the other hand, pawl catchers 2e, 2f are formed on the spacer 2 at positions corresponding to the above-mentioned pawls 7a, 7b. By fitting the pawls 7a, 7b formed on the light guide plate 6 into these pawl catchers 2e, 2f, it is possible to fix the light guide plate 6 in place. The liquid crystal display panel 5 is fixed to the light guide plate 6 using pressure sensitive adhesive double-coated tapes. An optical sheet 8 is arranged between the light guide plate 6 and the liquid crystal display panel 5 for effectively transmitting light there between.

Here, as shown at the short side in FIG. 4A by forming pawl catchers 1b in the metal frame 1 at positions corresponding to the pawl catchers of the spacer 2, the fixing of the light guide plate 6 can be reinforced. Further, the structure for fixing the light guide plate 6 used in this embodiment may be applied to the above-mentioned embodiment 1 to embodiment 3. Further, the structure for fixing and holding the liquid crystal display panel 5 may adopt the similar structure explained in conjunction with the above-mentioned embodiment 1 to embodiment 3.

Compared to the above-mentioned respective embodiments, this embodiment can simplify the constitution and hence, it is possible to easily reduce the thickness and the weight of the whole liquid crystal display device and, at the same time, the lowering of luminance can be obviated through the effective utilization of light from the light guide plate 6. Further, an external impact transmitted from the metal frame 1 to the light guide plate 6 can be absorbed or attenuated by the spacer 2 so that a damage on the liquid crystal display panel 5 which is adhered to the light guide plate 6 using the pressure sensitive double-sided tapes can be reduced.

Figure 5:
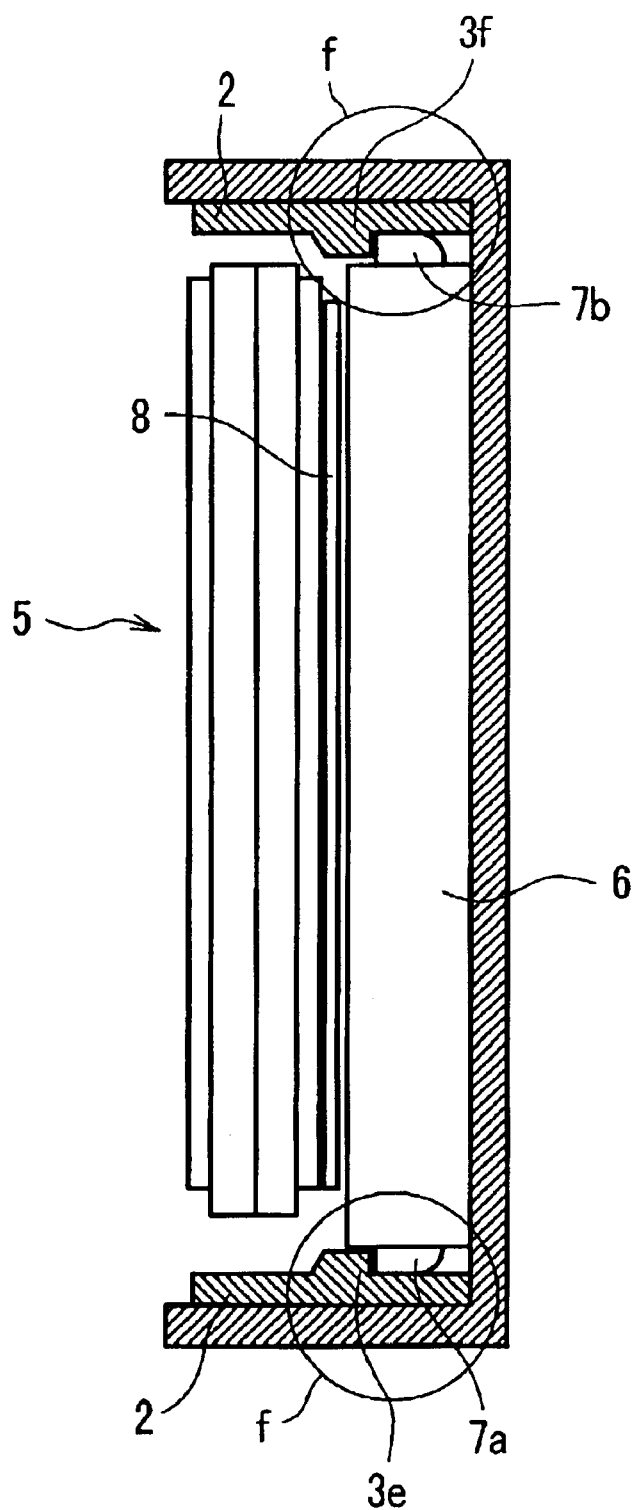
FIG. 5 is a cross-sectional view for explaining the fifth embodiment of the liquid crystal display device according to the present invention.

FIG. 5 is a cross-sectional view for explaining the fifth embodiment of a liquid crystal display device according to the present invention, wherein numerals used in FIG. 5 which are equal to those used in the above-mentioned respective drawings indicate the identical functional portions. Also in this embodiment, a spacer 2 is fixed to and along an inner wall surface of a metal frame 1 by fusing or injection molding. The spacer 2 is formed by molding using a resin material having high reflectance. Although the spacer 2 is mainly provided for suppressing the lowering of luminance attributed to the leaking of light from a light guide plate 6, the spacer 2 also has a function of protecting a liquid crystal display panel 5 and the light guide plate 6 from an external impact.

Two parallel sides (short sides in this embodiment) of the light guide plate 6 which constitutes a backlight are provided with pawls 7a, 7b respectively. Two pawls are formed on each short side in this embodiment. Although these pawls 7a, 7b are integrally formed with the light guide plate 6 in the same manner as the fourth embodiment, they may be adhered to the light guide plate 6 as separate parts. On the other hand, engaging protrusions 3e, 3f are formed on the spacer 2 at positions corresponding to the above-mentioned pawls 7a, 7b. By engaging the pawls 7a, 7b formed on the light guide plate 6 with these engaging protrusions 3e, 3f, it is possible to fix the light guide plate 6 in place. With respect to other constitutions, they are similar to those of the fourth embodiment.

Compared to the above-mentioned first to third embodiments, in the same manner as the fourth embodiment, this embodiment can also simplify the constitution and hence, it is possible to easily reduce the thickness and the weight of the whole liquid crystal display device and, at the same time, the lowering of luminance can be obviated through the effective utilization of light from the light guide plate 6. Further, an external impact transmitted from the metal frame 1 to the light guide plate 6 can be absorbed or attenuated by the spacer 2 so that a damage on the liquid crystal display panel 5 which is adhered to the light guide plate 6 using the pressure sensitive double-sided tapes can be reduced.

Figure 6:
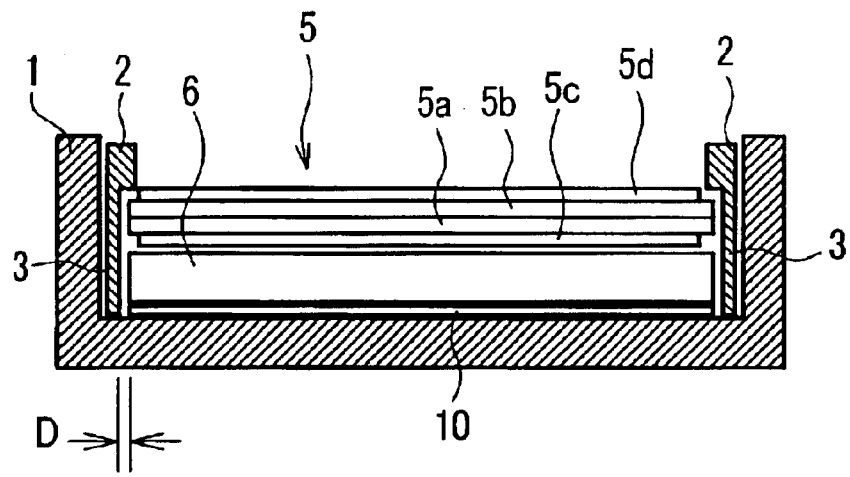
FIG. 6 is a cross-sectional view for explaining the sixth embodiment of the liquid crystal display device according to the present invention.

FIG. 6 is a view for explaining the sixth embodiment of a liquid crystal display device according to the present invention and is also across-sectional view in the same direction as long sides of a liquid crystal display device. Numerals in FIG. 6 equal to those used in the FIG. 1 to FIG. 5 indicate the identical functional portions. Also in this embodiment, a spacer 2 is fixed to and along an inner wall surface of a metal frame 1 by fusing or injection molding in the same manner as FIG. 3 to FIG. 5. The spacer 2 is formed by molding using a resin material having high reflectance. Although the spacer 2 is mainly provided for suppressing the lowering of luminance attributed to the leaking of light from a light guide plate 6, the resin layer 2 also has a function of protecting a liquid crystal display panel 5 and the light guide plate 6 from an external impact.

The liquid crystal display panel 5 is laminated to the light guide plate 6. The first portion 2 of the spacer has a thickness larger than a thickness of the second portion 3 at the liquid crystal display panel side 5. The liquid crystal display panel 5 is held and fixed by a stepped portion defined between the first portion 2 and the second portion 3. Although it depends on the thickness of the first portion 2, the first portion 2 and the second portion 3 are respectively made of resins different from each other, and the first portion 2 is made of soft resin whereby the mounting of the liquid crystal display panel 5 can be facilitated.

Figure 7:
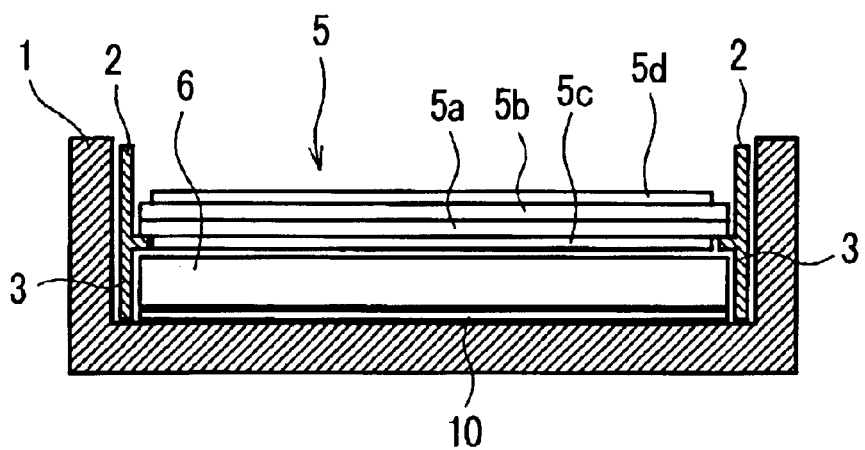
FIG. 7 is a cross-sectional view for explaining a modification of the sixth embodiment of the liquid crystal display device according to the present invention.

To a portion of a bottom portion of the metal frame 1, a lower spacer 10 is provided for performing the impact attenuation and the positioning of the liquid crystal display panel 5 and the light guide plate 6. Further, with the provision of the lower spacer 10, it is possible to arrange a flexible printed circuit board which is connected to the liquid crystal display panel 5 below the light guide plate 6. Further, the panel holding structure may adopt the constitution shown in FIG. 7. The light guide plate 6 is held by a stepped portion defined between a first portion 2 and a second portion 3 of the spacer. The liquid crystal display panel 5 is adhered to the light guide plate 6 using pressure sensitive adhesive double-coated tapes. Since the liquid crystal display panel 5 and the light guide plate 6 are fixed to each other using the pressure sensitive adhesive double-coated tapes, it is sufficient to fix either one of the liquid crystal display panel 5 or the light guide plate 6 using the spacer.

Compared to the above-mentioned respective embodiments, this embodiment can also simplify the constitution and hence, it is possible to easily reduce the thickness and the weight of the whole liquid crystal display device and, at the same time, the lowering of luminance can be obviated through the effective utilization of light from the light guide plate 6. Further, an external impact transmitted from the metal frame 1 to the light guide plate 6 can be absorbed or attenuated by the spacer 2 so that a damage on the liquid crystal display panel 5 which is adhered to the light guide plate 6 using the pressure sensitive double-sided tapes can be reduced. An end face of the light guide plate 6 and the second portion 3 of the spacer are spaced apart from each other by a gap D. By adjusting a distance of the gap D, it is possible to suppress the interference of light in the inside of the light guide plate 6 and can suppress the brightness irregularities of the light guide plate 6.

Figure 8:
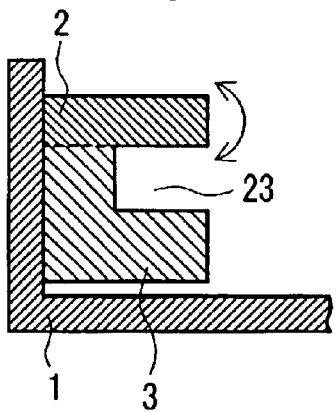
FIG. 8 is a cross-sectional view of an essential part of one example of a shape of a spacer for explaining the seventh embodiment of the liquid crystal display device according to the present invention.
Figure 9:
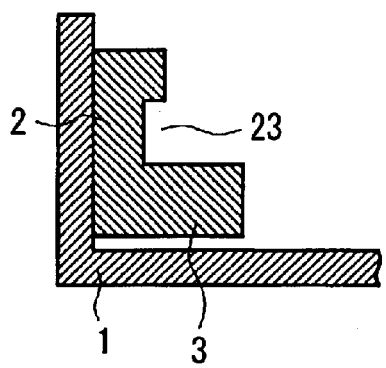
FIG. 9 is a cross-sectional view of an essential part of one example of a shape of a spacer for explaining a modification of the seventh embodiment of the liquid crystal display device according to the present invention.

FIG. 8 and FIG. 9 are cross-sectional views showing essential parts of examples of shape of the spacers for explaining the seventh embodiment of the liquid crystal display device according to the present invention. FIG. 8 shows the spacer having an approximately laterally U-shaped cross section, wherein a first portion 2 is formed of resin softer than resin for forming a second portion 3. In mounting a liquid crystal display panel, the first portion 2 is deformed as indicated by an arrow and the liquid crystal display panel 5 is fitted into a groove 23 defined between the first portion 2 and the second portion 3. Further, although FIG. 9 shows the spacer having an approximately laterally U-shaped cross section in the same manner as the spacer shown in FIG. 8, a first portion 2 and a second portion 3 are formed of the same resin. Then, by reducing a protrusion quantity of the first portion 2 toward the liquid crystal display panel side than that of the second portion 3, the insertion of the liquid crystal display panel is facilitated.

End faces of the light guide plate 6 are arranged to face the second portion 3 of the spacer and hence, the leaking of light from the end faces of the light guide plate 6 can be suppressed. Further, by adjusting a distance between the end surface of the light guide plate 6 and the spacer, it is possible to suppress the interference of light in the inside of the light guide plate 6 so that the luminance irregularities of the light guide plate 6 can be suppressed.

By replacing the above-mentioned respective constitutions with the spacers of the respective embodiments, it is possible to obtain advantageous effects brought about by the above-mentioned respective embodiments such as the enhancement of luminance, the firm holding of the light guide plate and the liquid crystal display panel, and the external impact resistance.

Figure 10:
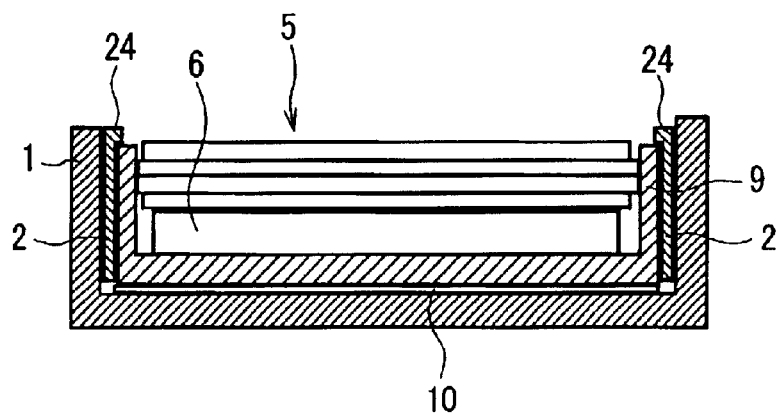
FIG. 10 is across-sectional view for explaining the eighth embodiment of the liquid crystal display device according to the present invention.

FIG. 10 is a cross-sectional view similar to FIG. 6 which explains the eighth embodiment of the liquid crystal display device according to the present invention. This embodiment is characterized in that the present invention is applied to the above-mentioned liquid crystal display device having a resin mold. That is, this embodiment shows an example in which the present invention is applied to the liquid crystal display device which does not aim at the miniaturization thereof. A light guide plate 6 and a liquid crystal display panel 5 are housed and are integrally formed with a resin mold 9 as is known. A spacer 2 having a shape similar to a shape of the spacer shown in FIG. 6 is fixed to an inner surface of the metal frame 1 in the same manner as the respective embodiments.

That is, the spacer 2 has engaging protrusions 24 which protrude in the direction toward the resin mold 9 housed in the metal frame 1 at portions thereof which correspond to open-end portion of the metal frame 1. The resin mold 9 which incorporates the light guide plate 6 and the liquid crystal display panel 5 therein is inserted into the metal frame 1 in a state that the engaging protrusions 24 are resiliently deformed. Thereafter, due to the return of the engaging protrusions 24 to the original position, the resin mold 9 is fixed to the metal frame 1. Due to such a constitution, the spacer 2 also has a function of a cushion member and protects the whole liquid crystal display device from an external impact.

Figure 11:
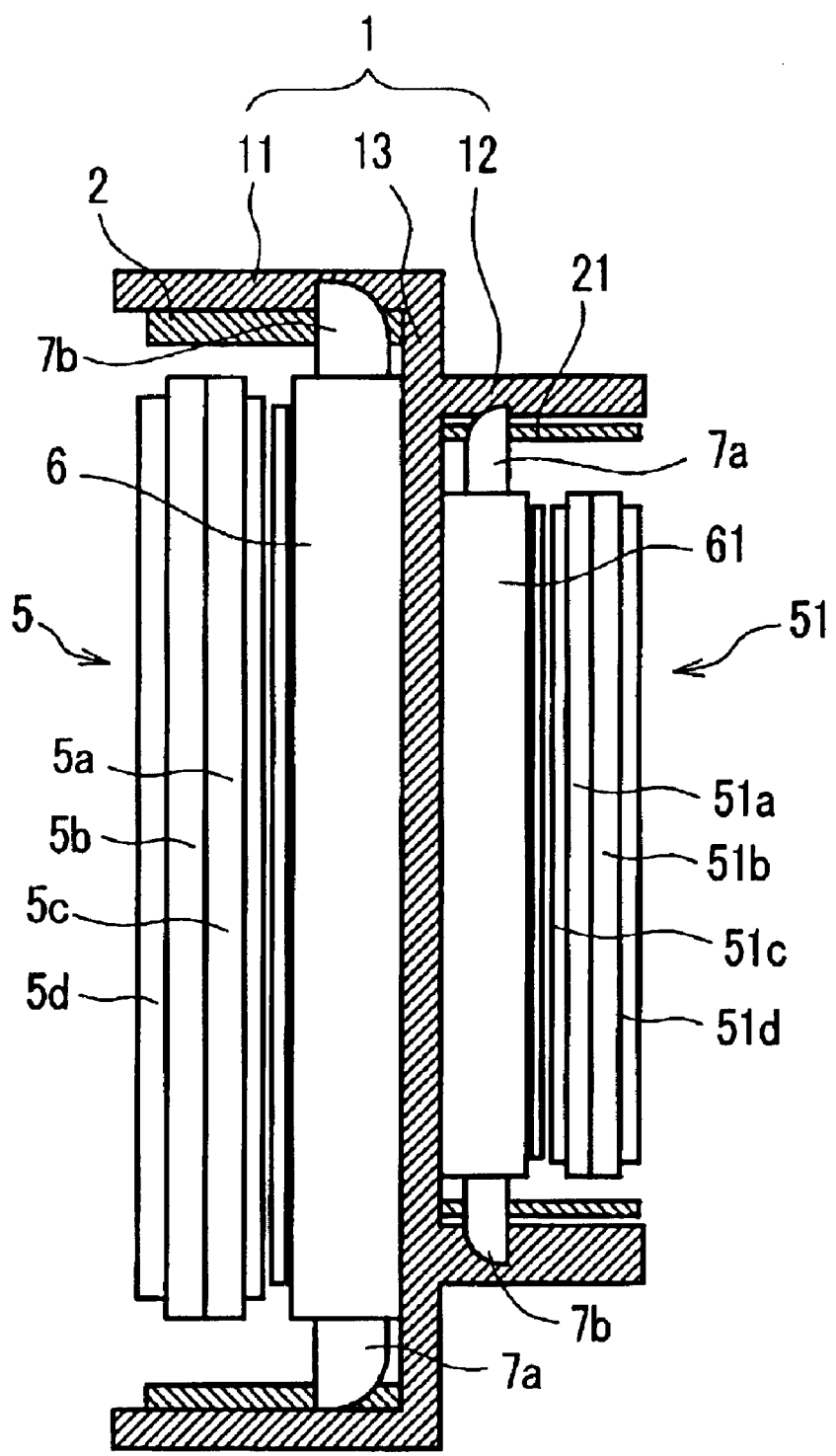
FIG. 11 is a cross-sectional view for explaining the ninth embodiment of the liquid crystal display device according to the present invention.

FIG. 11 is a cross-sectional view of a liquid crystal display device for explaining the ninth embodiment of the present invention. Here, in FIG. 11, the liquid crystal display device is depicted simply by lines for facilitating the understanding of the constitution. In the liquid crystal display device shown in FIG. 11, on a back surface of a first liquid crystal display panel 5 and a light guide plate 6, a second liquid crystal display panel 51 and a light guide plate 62 are arranged. A metal frame 1 is constituted of a bottom frame portion 13, a first side wall portion 11 extending in one vertical direction from the bottom frame portion 13, and a second side wall portion 12 extending in another vertical direction from the bottom frame portion 13. Here, the metal frame 1 houses the first liquid crystal display panel 5 and the light guide plate 6 in a space defined by the bottom frame portion 13 and the first side wall portion 11 and houses the second liquid crystal display panel 51 and the light guide plate 61 in a space defined by the bottom frame portion 13 and the second side wall portion 12.

The metal frame 1 is constituted by integrally forming a first liquid crystal display panel frame and a second liquid crystal display panel frame. A spacer 2 is provided to the first side wall portion 11 and a spacer 21 is provided to the second side wall portion 12. Respective holding mechanisms for holding the liquid crystal display panels and light guide plates have the same constitution as the holding mechanism shown in FIG. 4. According to this embodiment, even when the second liquid crystal display device is arranged on the back surface of the first liquid crystal display device, it is possible to reduce a thickness of the whole liquid crystal display device. Further, the holding mechanisms for holding the liquid crystal display panels and the light guide plates may have the constitution equal to the constitution shown in FIG. 5.

Figure 12:
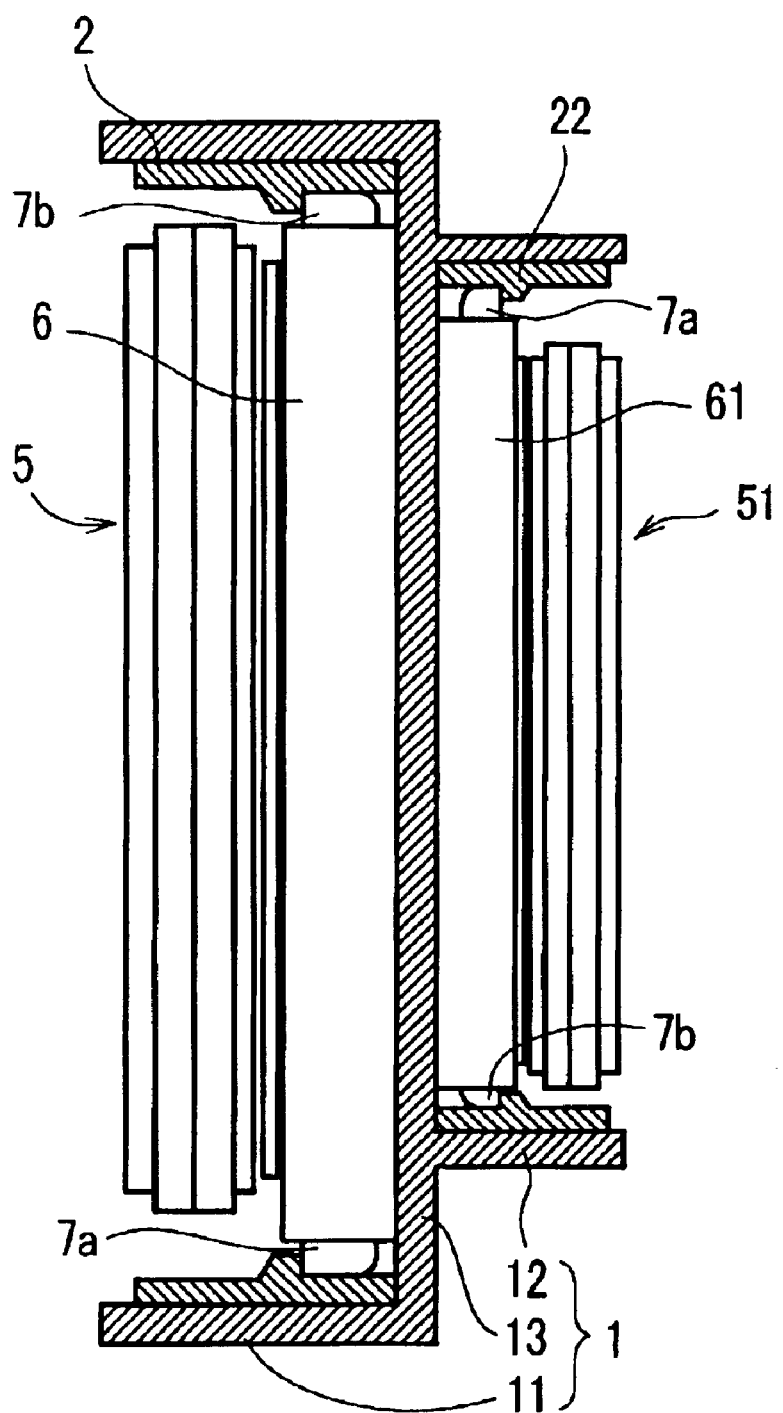
FIG. 12 is a cross-sectional view of a liquid crystal display device to which a panel holding mechanism shown in FIG. 5 is applied to a liquid crystal display device which arranges two liquid crystal display panels on a back surface thereof.

FIG. 12 is a cross-sectional view of a liquid crystal display device which is formed by applying the panel holding mechanism shown in FIG. 5 to a liquid crystal display device which arranges two liquid crystal display panels such that their back surfaces are merged. Also in FIG. 12, the liquid crystal display device is depicted by lines to facilitate the understanding of the constitution. Further, as the holding mechanism for holding the liquid crystal display panel, other embodiments which do not use resin molding may be used.

Figure 13:
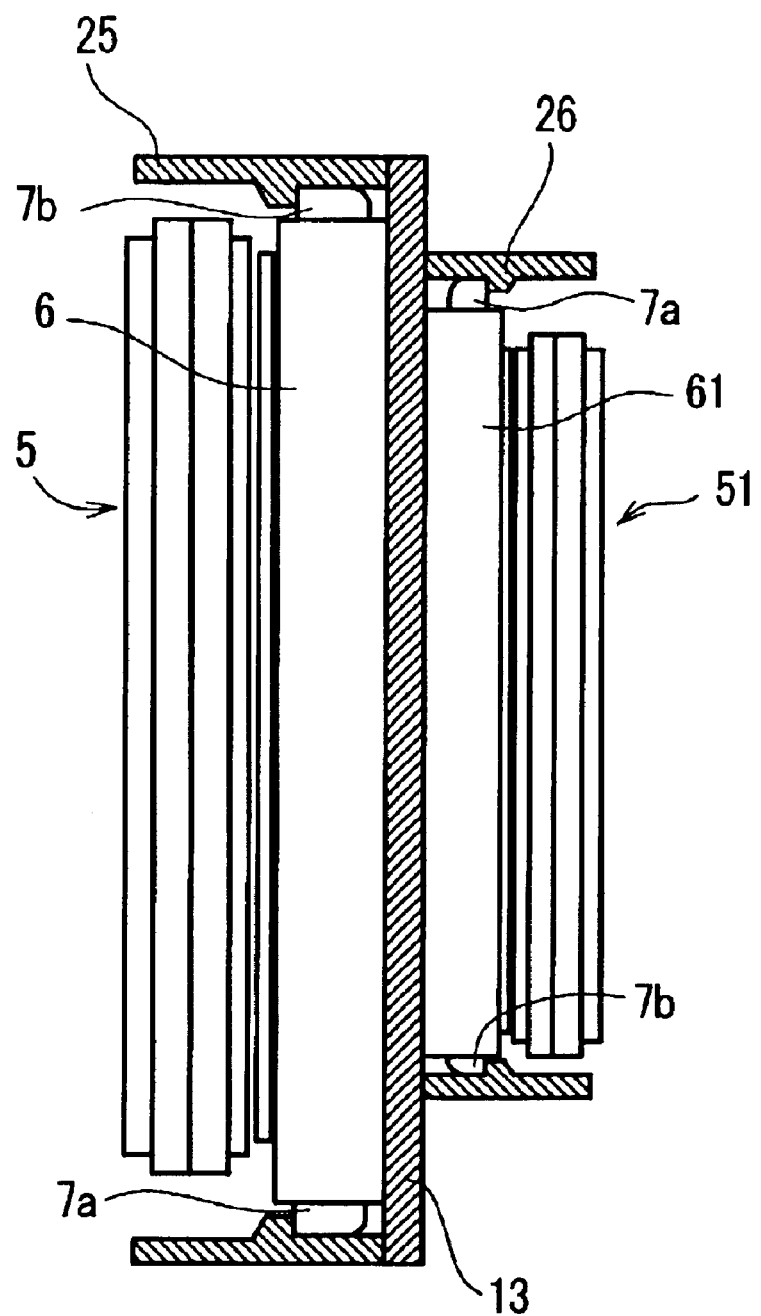
FIG. 13 is a cross-sectional view for explaining the tenth embodiment of the liquid crystal display device according to the present invention.

FIG. 13 is a cross-sectional view of a liquid crystal display device for explaining the tenth embodiment of the present invention. In the liquid crystal display device shown in FIG. 13, on a back surface of a first liquid crystal display panel 5 and a light guide plate 6, a second liquid crystal display panel 51 and a light guide plate 62 are arranged. A frame 1 is constituted of a metal-made bottom frame portion 13, a first resin-made side wall 25 extending in one vertical direction from the bottom frame portion 13, and a second resin-made side wall 26 extending in another vertical direction from the bottom frame portion 13. Here, the frame 1 houses the first liquid crystal display panel 5 and the light guide plate 6 in a space defined by the bottom frame portion 13 and the first resin side wall 25 and houses the second liquid crystal display panel 51 and the light guide plate 61 in a space defined by the bottom frame portion 13 and the second resin-made side wall 26.

The frame 1 is constituted by integrally forming a first liquid crystal display panel frame and a second liquid crystal display panel frame. The first resin sidewall 25 and the second resin side wall 26 also function as spacers. Respective holding mechanisms for holding the liquid crystal display panels and light guide plates have the same constitution as the holding mechanisms shown in FIG. 12. Further, the holding mechanisms for holding the liquid crystal display panels and the light guide plates may have the constitution equal to the constitution shown in FIG. 11.

The resin-made sidewalls of this embodiment may preferably be made of resin having high elastic modulus for holding the liquid crystal display panels and the backlights.

According to this embodiment, even when the second liquid crystal display device is arranged on the back surface of the first liquid crystal display device, it is possible to reduce a thickness of the whole liquid crystal display device. Further, since it is possible to minimize the necessary space, the contour of the liquid crystal display device can be reduced. Still further, by forming the resin-made side walls which face side faces of the light guide plates using white resin, it is possible to suppress the leaking of light.

The present invention includes any desired combination of the above-mentioned respective embodiments and can achieve the advantageous effects of the present invention at maximum by selecting an optimum combination in response to a size of the liquid crystal display panel, the constitution of a driving printed circuit board, the arrangement structure of driving input means and the like. Further, although the metal frame is formed by injection molding in the above-mentioned embodiment, the metal frame may be formed by a press, resin portions are formed by injection molding, and the metal frame and the resin are bonded to each other by heat fusing.

As has been explained in conjunction with the embodiments heretofore, according to the present invention, it is possible to realize the reduction of thickness and weight of the whole liquid crystal display device, and to obviate damages to the liquid crystal display panel or the like by attenuating the external impact transmitted to the liquid crystal display panel and the light guide plate from the metal frame. Further, by setting the shape or physical characteristics of the spacer, the assembling of the liquid crystal display panel is facilitated and the removal of the liquid crystal display panel from the metal frame can be effectively prevented. Still further, by forming the spacer by molding using the resin material having high reflectance, it is possible to provide the liquid crystal display device having high luminance which can obviate the lowering of luminance by effectively utilizing light from the light guide plate.

What is claimed is:

1. A liquid crystal display device comprising a liquid crystal display panel, a light guide plate which is arranged on a back side of the liquid crystal display panel, a metal frame which has a frame-like side wall and houses the liquid crystal display panel and the light guide plate therein, and a spacer which is interposed between two respective parallel sides of the liquid crystal display panel and the side wall of the metal frame and is integrally formed with the metal frame, wherein the spacer is made of resin having high reflectance, the liquid crystal display panel is housed in the inside of the metal frame due to resilience of the spacer, and the liquid crystal display panel is held by the metal frame due to a repulsive force of the resilience.

2. A liquid crystal display device according to claim 1, wherein the spacer includes a first portion which holds the liquid crystal display panel due to the repulsive force of the resilience and a second portion which holds the light guide plate in place, and a resilience quantity of the first portion is larger than that of the second portion.

3. A liquid crystal display device according to claim 2, wherein the first portion is comprised of protrusions which are formed discontinuously along the sides of the liquid crystal display panel and the resilience is generated by the deflection of the protrusions.

4. A liquid crystal display device according to claim 2, wherein the first portion and the second portion are respectively made of resins which differ in the resilience quantity from each other.

5. A liquid crystal display device comprising a liquid crystal display panel, a light guide plate which is arranged on a back side of the liquid crystal display panel, a metal frame which has a frame-like side wall and houses the liquid crystal display panel and the light guide plate therein, and a spacer which is interposed between two respective parallel sides of the liquid crystal display panel and the side wall of the metal frame and is integrally formed with the metal frame, wherein the spacer is made of resin having high reflectance, pawls are formed on end peripheries of the light guide plate which face the spacer in an opposed manner, pawl catchers are formed on the spacers, the light guide plate is fixed in place in the metal frame by engaging the pawls with the pawl catchers, the liquid crystal display panel is housed in the metal frame due to resilience of the spacer, and the liquid crystal display panel is held by the metal frame due to a repulsive force of the resilience.

6. A liquid crystal display device according to claim 5, wherein the spacer includes a first portion which holds the liquid crystal display panel due to the repulsive force of the resilience and a second portion which holds the light guide plate in place, and a resilience quantity of the first portion is larger than that of the second portion.

7. A liquid crystal display device according to claim 5, wherein the first portion is comprised of protrusions which are formed discontinuously along the sides of the liquid crystal display panel and the resilience is generated by the deflection of the protrusions.

8. A liquid crystal display device according to claim 5, wherein the first portion and the second portion are respectively made of resins which differ in the resilience quantity from each other.

* * * * *